April 14, 1964     L. L. ATHERTON     3,128,564
METHOD OF MAKING UP A TEST AND PROVIDING A KEY THEREFOR
Filed July 10, 1962

Lawrence L. Atherton
INVENTOR.

BY 
Attorneys

United States Patent Office 3,128,564
Patented Apr. 14, 1964

3,128,564
METHOD OF MAKING UP A TEST AND PROVIDING A KEY THEREFOR
Lawrence L. Atherton, 433 Knickerbocker Ave., Springfield, Ohio, assignor, by direct and mesne assignments, of forty-five percent to Thomas C. Rousseau, Tipp City, Ohio, and ten percent to Warren W. Hamilton, Yellow Springs, Ohio
Filed July 10, 1962, Ser. No. 208,758
1 Claim. (Cl. 35—48)

The present invention generally relates to a duplicator master assembly which basically includes two spirit duplicator master sheets assembled with certain carbon sheets and removable separator sheets and is primarily for use by teachers to facilitate the making of and marking of tests given to students.

By using the duplicator assembly of the present invention, a separate answer sheet for the student is unnecessary which is important in lower elementary grades where the use of multiple choice tests and separate answer sheets are not in keeping with the developmental stage of the children. This assembly also enables the teacher to be free of the seemingly endless chore of marking the papers individually thereby allowing the teacher to make better use of his time in helping the children and in preparing for classroom activities and the like. With this assembly, the test paper may have substantially any make up desired whereby the questions are placed on one of duplicator masters and the student's answer placed on that same sheet which is a duplicator master. After the test has been taken by the students they would be rerun through the duplicator using the duplicator master having the correct answers or responses indicated thereon in red or other distinguishable color thereby enabling the score to be readily computed by counting where the red key and the student's response do not correspond. By placing the correct answer on the master having the student's answers thereon, the student will be apprised of what the correct response should have been thus providing a secondary stimulus when the test paper is returned to the student for review after grading.

A very important object of the present invention is to provide a duplicator master assembly in accordance with the preceding discussion which is simple in construction, easy to use, efficient for its particular purposes and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
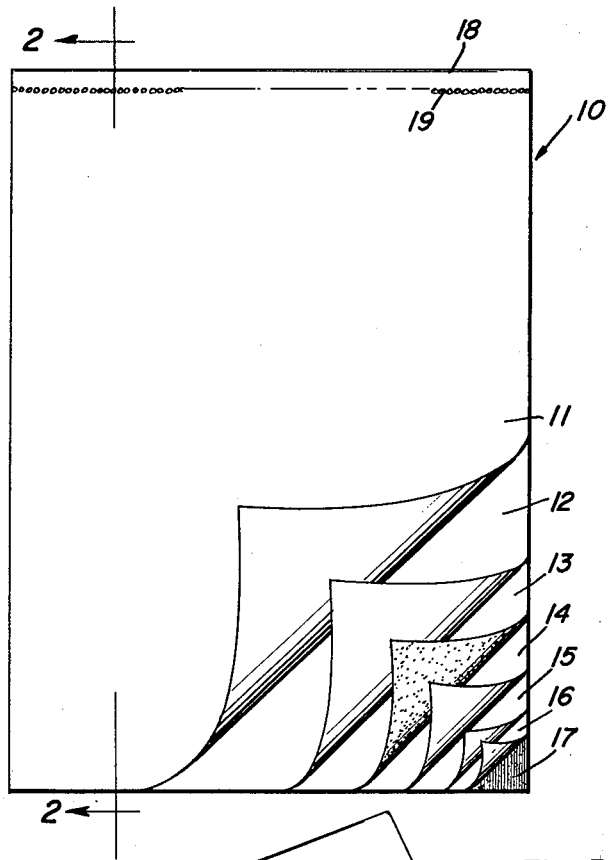
FIGURE 1 is a plan view of the duplicator master assembly with one corner of each sheet being folded back.
Figure 2:
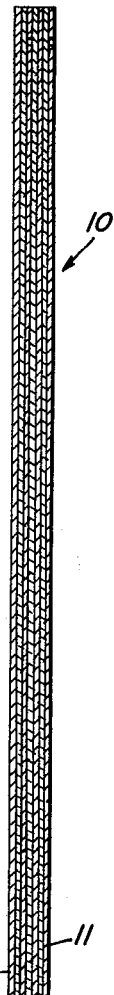
FIGURE 2 is a longitudinal, vertical sectional view taken substantially upon a plane passing along section line 2—2 of FIGURE 1.
Figure 3:
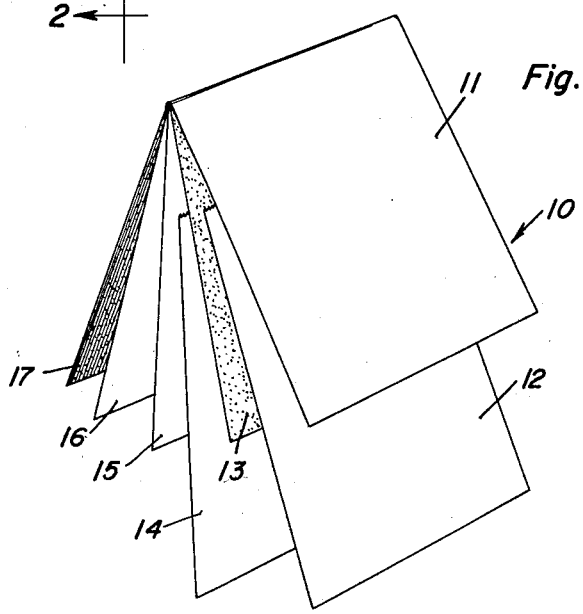
FIGURE 3 is a group perspective view illustrating schematically the orientation of the components.
Figure 3:
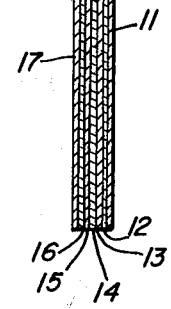

Referring now specifically to the drawings, the numeral 10 generally designates the duplicator master assembly of the present invention which includes a plurality of assembled sheets including a top master sheet 11, a removable separator sheet 12, a two-sided carbon sheet 13 which may be either black or purple carbon, a removable separator sheet 14, a second master 15, a removable separator sheet 16 and a single sided red carbon sheet 17.

All of the sheets may be connected together at their top edge in any suitable manner with the binding thereof being designated by numeral 18. Such connection may be in the form of an adhesive joint or latch. The master sheets 11 and 15 are perforated along line 19 and the separator sheets 12, 14 and 16 are removed at various times during the use of this assembly. Carbon sheet 17 is a standard red carbon sheet used for making a reverse impression on the back of a master sheet. Carbon sheet 13 is composed of carbon on both sides either purple or black with the quality of carbon differing. The carbon on the sides facing the top master sheet 11 is of the quality necessary for registering a reverse impression for the spirit duplicator. The carbon on the opposite side facing the top of the second master sheet 15 is of a lower quality since its function is only to record the identical material placed upon master duplicator sheet 11 in the identical position upon the top surface of the second master sheet 15. The size and shape of the sheets are conventional and are used with commercially available duplicator machines using spirit duplicator paper. The separator sheets may be easily detached by either providing a perforated line adjacent the upper edge thereof or merely lightly attaching the separator sheets to the assembly.

In making up a test, the teacher would first remove separator sheet 12 and separator sheet 14 from the duplicate master. The teacher would then write, draw or type the test to be given on the top master sheet 11. Carbon sheet 13 would register the material on the back of master sheet 11 and on the front only of master sheet 15 which is the second master sheet. Since separator sheet 16 was left in place, nothing would be registered on the back of the second master sheet 15. After preparing the test, the teacher would make the automatic key or answer by removing the separator sheet 16 and marking the correct responses on the second master sheet 15 thereby providing the key in red on the undersurface of the second master sheet 15. Then by removing the first master sheet 11 and sending it through a spirit duplicator, the teacher would provide the test sheets for the students. After the tests were taken, the test sheets would be rerun through the duplicator using the second master sheet 15 to mark the correct responses on the test sheets with such correct responses being marked in red. Thus, scoring becomes no more than the counting of incidences where the red key or the correct response and the student's response do not correspond. This also will tell the student what the correct response should have been since the correct response, in each instance, will be marked correctly on the student's test paper. With this method, a teacher can mark approximately ninety papers in a minute and score them in approximately 10 to 15 minutes which is considerable improvement over conventional practices of the teacher grading each individual paper.

By using the duplicator master assembly, it requires substantially no additional time in making up the tests and no additional time in making sufficient copies thereof for each individual student as is normally required. The only difference is that the test will be made up on spirit duplicator paper and each individual test will be on a spirit duplicator paper and the students will answer on the spirit duplicator paper with any suitable marking implement such as a pencil or the like thereby requiring no special implement. Then when the papers are to be graded, they are merely run through the duplicator having the duplicator master thereon with the correct responses marked thereon so that such correct responses will be placed on the test paper completed by the students in red or other distinguishable color whereby facilitating the grading of the paper by the teacher by merely counting the incidences that the correct response placed on the test paper does not coincide with the student's response or answer. In addition, it provides the correct response for the student to consider when he receives his test paper back after grading.

The device of the present invention employs conventional duplicator sheets employing conventional practices insofar as the duplicator machine is concerned and the cost and ease of use of the device are relatively insignificant as compared with the time saved in grading a group of test papers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a method of making up a test and providing a key therefor, the steps of; constructing a duplicator master assembly comprising a top master sheet, a double-faced carbon sheet underlying the top master sheet with the carbon face facing the undersurface of the top master sheet being of spirit duplicator quality, a second master sheet underlying the double-faced carbon sheet, a single-faced carbon sheet, of a color distinguishable from the color of the double-faced carbon sheet, underlying the second master sheet with the distinguishable carbon thereon facing the undersurface of the second master sheet and being of spirit duplicator quality, a first separator sheet disposed between the top master sheet and the double-faced carbon sheet, a second separator sheet disposed between the double-faced carbon sheet and the top surface of the second master sheet and a third separator sheet disposed between the second master sheet and the single faced sheet; removing the first and second separator sheets; printing test questions on the top surface of the top master sheet, these test questions being simultaneously printed upon the undersurface of the top master sheet and the top surface of the second master sheet through the double-faced carbon sheet; removing the third separator sheet; and placing the correct responses to the question on the second master sheet, these correct responses being simultaneouly printed on the reverse surface of the second master sheet through the single-faced carbon.

References Cited in the file of this patent

UNITED STATES PATENTS

| | | |
|---|---|---|
| 701,443 | Wilson | June 3, 1902 |
| 1,252,199 | Thompson | Jan. 1, 1918 |
| 2,118,888 | Lewis et al. | May 31, 1938 |
| 2,386,872 | Lewis | Oct. 16, 1945 |
| 2,780,169 | Fortner | Feb. 5, 1957 |